United States Patent [19]

Barsellotti

[11] 4,071,712

[45] Jan. 31, 1978

[54] LINE CIRCUIT FOR KEY TELEPHONE SYSTEMS

[75] Inventor: John Anthony Barsellotti, Guelph, Canada

[73] Assignee: International Standard Electric Corporation, New York, N.Y.

[21] Appl. No.: 732,237

[22] Filed: Oct. 14, 1976

[51] Int. Cl.² ............................................. H04M 1/00
[52] U.S. Cl. ....................................................... 179/99
[58] Field of Search ..................... 179/99, 81 R, 18 F, 179/18 FA

[56] References Cited

U.S. PATENT DOCUMENTS

| | | | |
|---|---|---|---|
| 3,647,983 | 3/1972 | Fitzsimmons et al. | 179/99 |
| 3,715,516 | 2/1973 | Ebrahimi | 179/99 |
| 3,748,403 | 7/1973 | Schartmann et al. | 179/99 |
| 3,840,710 | 10/1974 | Limiero et al. | 179/99 |
| 3,895,192 | 7/1975 | Angner et al. | 179/99 |
| 4,004,106 | 1/1977 | Yachabach | 179/99 |

*Primary Examiner*—William C. Cooper
*Assistant Examiner*—Gerald L. Brigance

*Attorney, Agent, or Firm*—James B. Raden; Marvin M. Chaban

[57] ABSTRACT

A line circuit for a key telephone system using three relays, a line relay, a ring relay and a combined off-hook and hold relay. To control the energization of the ring relay and the off-hook and hold relay responsive to inputs from the exchange or from a station of the line, an operational amplifier network is used. Two amplifiers are used as individual relay drivers and two are used as comparators. The amplifiers of this network may be identical circuits as part of a quad circuit chip. On a ring signal from the exchange, a ring comparator amplifier is activated to energize the ring relay. On a station of the line going off-hook, the off-hook driver amplifier is activated directly to energize its relay. When a station of the line goes into hold, the off-hook and the hold comparator amplifier is activated to energize both the ring relay and the off-hook relay. The line relay is energized during only the ring and hold conditions, and is shunted against energization during the off-hook condition. The hold condition is sensed by the line relay being energized, and the conventional A lead ground having been open-circuited.

7 Claims, 1 Drawing Figure

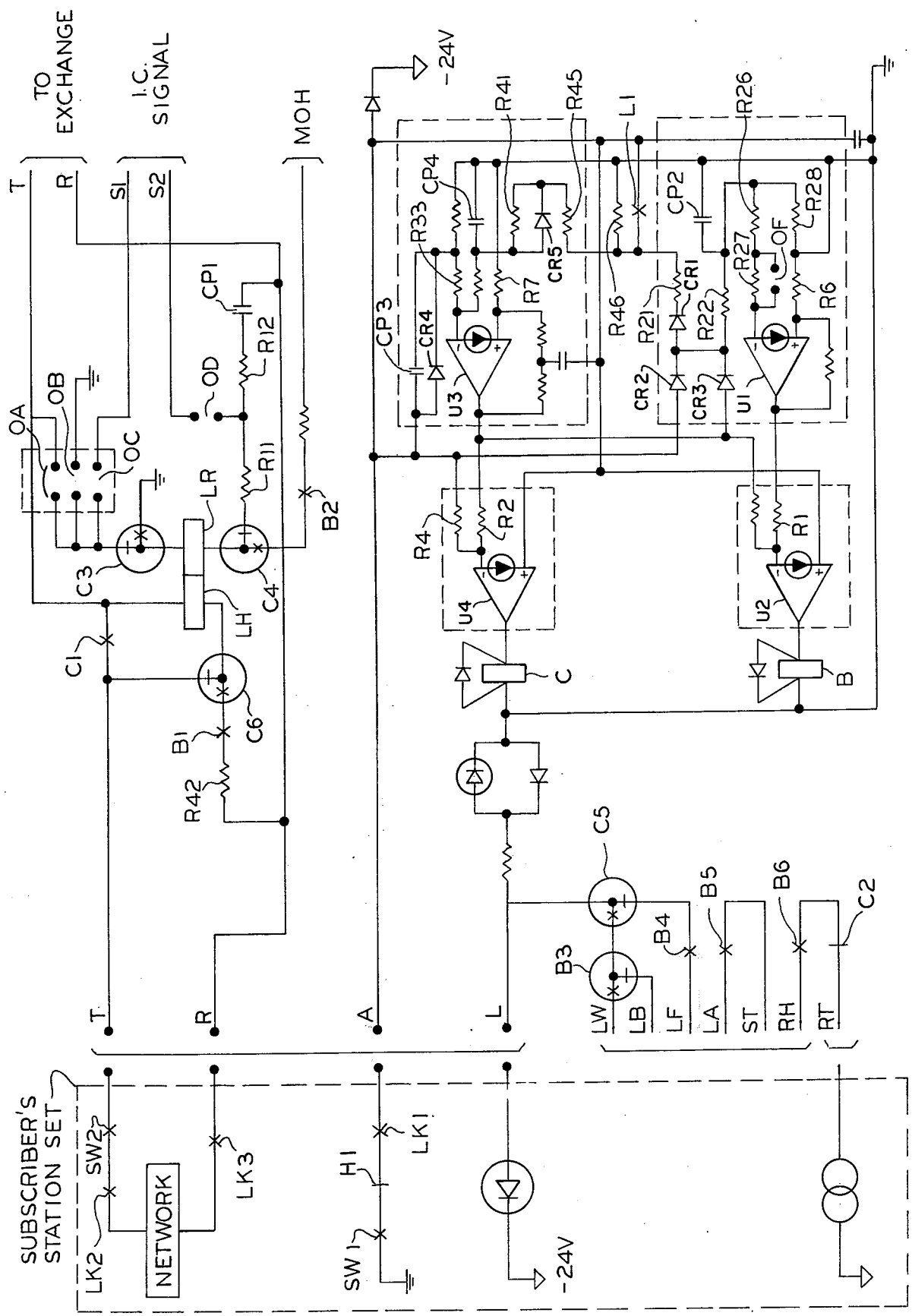

LINE CIRCUIT FOR KEY TELEPHONE SYSTEMS

BACKGROUND OF THE INVENTION

Line circuits for key telephone systems are well known based on the Bell System 400B line card (U.S. Pat. No. 3,239,410 to Morse et al.) and the 400D card (U.S. Pat. No. 3,436,488 to Barbato et al.).

Later reference patents such as No. 3,647,983 to Fitzsimons et al. and 3,715,516 to Ebrahimi show variations using three relays to produce the same results as the later Bell patent using the same input conditions and producing the same outputs. These two patents use a line relay, a ring control relay and a combined busy and hold control relay in essentially the same manner as shown by Barbato. In the former two patents, the two-winding line relay is held energized in all in-use conditions. In the Barbato patent the two-winding line relay is energized only during ring condition and hold condition and is restored during the busy or seize condition. The Fitzsimons reference employs transistors and diodes as the operative members and Ebrahimi uses AND gates and OR gates to control the operation of the two control relays.

In all the references noted above, the line relay is a two-winding relay which has a single contact pair in the circuit of the control relays while the single-winding control relays have plural contacts in the lamp leads, the ringing supply in the circuit to the line relay and in a line bridge to provide the hold. All the references noted employ the conventional A lead which is grounded during the seize and which lead is open circuited on the transition to hold prior to opening of the line loop through the line conductors.

SUMMARY OF THE INVENTION

The present invention discloses a three-relay line circuit for a key telephone system using a line relay (L relay), a ring control relay (B relay) and combined busy and hold control relay (C relay). The line relay is a two-winding relay energized similarly to that of the cited Barbato reference, i.e., energized over one winding on a ring condition and over the other winding for a hold condition. The line relay is shunted against energization during the seize or busy condition. The line relay on energization over either winding operates its single set of contacts.

The B and C relays are controlled by paired operational amplifiers, each pair including a comparator and a driver cascaded to the winding of a respective one of the control relays B or C. The amplifiers may be identical current amplifiers of the type known as "Norton" amplifiers. Three operating conditions must be responded to — Ring, Busy and Hold. For ring, the ring comparator is switched on to actuate the ring driver and ring relay. The ring relay controls the lamp flash and local ring or buzzer supply to stations of the called line being rung. When a station of the line enters the busy or seize condition, ground on the A lead is fed directly to the C relay driver to cause the C relay to be energized. The A lead ground also switches the B comparator off and shuts off the B relay. The C relay on energization switches the lamp lead to a steady on and opens the ringing circuits further. The C relay on energization shunts the line relay and causes the line relay to release and remain released.

On a hold signal from the off-hook station, the A lead ground is open-circuited in the conventional sequencing before the line loop opens. The C driver is switched to its inoperative state to shut off the C relay. Release of this relay opens the line relay shunt and this relay is energized to close a path to the hold or C comparator. The C comparator switches to energize both the B and C relay drivers and the B and C relays. With both B and C relays operated, a hold path for the line relay is closed. A resistance bridge is closed across the line conductors, the subscriber lamps are pulsed at a wink rate with audible signalling cutoff by operation of the C relay.

Thus, in the circuit as shown, operation of the B comparator causes the energization of the B relay, operation of the C comparator causes both the B and C relays to be energized, while energization of the C relay alone is effected by the operation of the C relay driver.

It is therefore an object of the invention to provide an improved line circuit for key systems.

It is a further object of the invention to provide a line circuit for key systems which uses a plurality of operational amplifiers to provide the relay operating logic in the circuit.

It is still a further object of the invention to provide a line circuit for key systems in which the relay operating logic uses a plurality of identical operational amplifiers employed as paired compators and relay drivers.

BRIEF DESCRIPTION OF THE DRAWING

The single drawing shows a schematic circuit drawing of my invention.

DETAILED DESCRIPTION

In the drawing, I show my line circuit with a conventional two-winding line relay L having a low resistance hold winding LH and a higher resistance ring winding LR. The relay operates on energization over either winding to close its single pair of contacts L1 within the lower half or D.C. logic portion of the circuit.

The circuits to the line relay windings include conventional tip and ring conductors T and R directed to the subscribers station equipment at one end and directed to an exchange at the other end. The subscribers station equipment is similar to that shown in the cited Barbato patent and includes a line key with three contacts LK1, LK2 and LK3, hookswitch contacts SW1 and SW2 and hold key contacts H1. As the operation of these contacts is conventional as shown by many key system line circuit patents, the operation of these contacts will only be described where necessary to complete the explanation.

The D.C. relay logic circuitry includes the two relays B and C, each with one terminal of its single winding connected to ground and the other terminal of the respective windings are connected to the signal output of the respective relay drivers U2 and U4.

These drivers U2 and U4, and the comparators U1 and U3 preferably are identical Norton amplifiers which may be fabricated on a single chip. A suitable network component is the LM 3900 amplifier sold by National Semi Conductors or the MC 3100 sold by Motorola, which provides all four amplifiers.

The drivers U2 and U4 each have one input (+ input) negatively biased to the −24 volt source, and the other input (− input) connected through a suitable resistance of resistors R1 and R2 to receive the output of the respective comparators U1 and U3. A further path may be traced to the (−) input of driver U4 from the A lead and through resistance R4.

Amplifiers U1 and U3 are biased to act as comparators with their (+) inputs connected to reference ground through the heavy resistances of respective resistors R6 and R7. Thus, with the drivers and comparators U1-U4, the (−) input is the signal input which causes these amplifiers to switch and change states in response to the input conditions of the D.C. logic circuit, i.e., presence or absence of the A lead ground, and open or closed state of contacts L1 of the line relay.

Turning to the operation of the circuit, as is wellknown, there are four states in which the circuit may be, these being (1) Idle (2) Ring (3) Seize, Busy, Off-hook and (4) Hold.

In the idle condition, all relays are released; in the ring condition the line relay and relay B are energized; in the seize condition only the C relay is energized; and in the hold condition all three relays are energized, line, B and C.

RING

When the line served by the circuit is rung, a conventional interrupted A.C. ring signal is received over the T and R leads from the exchange. Over the T lead, a path may be traced through the closed OA strap for the divided ringing option, through the LR winding (which may be 755 ohms), closed C4 contacts, resistors R11 and R12, capacitor CP1 and back over the R lead. Relay L energizes, follows these interrupted bursts of A.C. and periodically closes its contacts L1. On closure of contacts L1, a charge is built up on capacitor CP2 over a path from −24 volts through resistor R21, diode CR1 and resistor R22. As the capacitor charges, the current is reduced to the negative input of the ring comparator U1 over a path through resistors R26 and R27. When ringing continues for a period sufficient to differentiate between random noise on the line and a true ringing signal, comparator U1 switches to emit an output signal through resistor R1 to the (−) input of the B relay driver U2 and energizes relay B; relay B operates.

The operation of relay B is conventional to switch the signalling supply to the ring lead RT after closing a path to the local ring interrupter and closing a path to the lamp flash lead.

During ringing, capacitor CP2 holds the comparator U1 switched between ring bursts. If the calling station hangs up or for any other reason, the ring input terminates, the line relay releases opening contacts L1. Capacitor CP2 discharges over a path through resistor R28 to ground. The switching threshold of the comparator U1 is reached, and the comparator switches to its idle state, shutting off driver U2 and relay B. This function is the wellknown time-out function and its duration and that of operation of the comparator U1 may be varied by the use of the optional OF strap shunting out resistor R27.

ANSWER (SEIZE)

When a station of the called line answers by going off-hook (closing the hook switch contacts SW1 and SW2) and depressing the line key and closing its contacts LK1, LK2 and LK3, ground appears on the A lead. This ground passes over the A lead through resistor R2 and the (−) input of driver U4 and causes driver U4 to switch to its operated state energizing the C relay. This action occurs independently of the state of the comparator U3.

In relay logic circuit, the A lead ground fed through diodes CR2 and CR4 and respective resistors R22 and R33 to the respective (−) input of comparators U1 and U3 to switch the comparators to the idle state and maintain them in that state. The path to comparator U1 passes through resistors R26 and R27 in a serial path from resistor R22. Naturally when comparator U1 is switched off, driver U2 is also switched off to deenergize the B relay which restores.

Relay C on operation performs the conventional functions of tripping the local ringing, switching the station lamp to a steady illuminated state. Further, relay C closes contacts C1 to shunt the LH winding of the line relay and provide a loss free voice path over the T and R leads. Relay C on operation switches contacts C3 and C4 to open the path to the LR winding. Relay L will, of course, be prevented from operation by the operation of the C relay.

When a subscriber wishes to initiate a call and accordingly goes off-hook, ground is switched onto the A lead as previously described, and the C relay is energized in the manner previously described.

HOLD

A subscriber can only place the line circuit in a hold condition when the line circuit is in the seized condition. Thus, before hold condition is entered, the C relay is energized, line relay and B relay are deenergized, and comparators U1, U2 and U3 are in their idle states.

On depression of the hold button, as is conventional, the first resultant action is removal of the ground from the A lead. This ground removal causes driver U4 to switch off shutting off relay C. The voltage at both terminals of capacitor CP3 is reduced to a value almost equal to the power supply voltage. This capacitor begins to charge to initiate a timing period to sense the hold condition.

When relay C restores, its contacts return to normal. Contacts C1 open to remove the shunt from the LH winding of the L relay.

As capacitor CP3 begins to charge, the (+) terminal of comparator U3 returns to the idle state voltage. During the time that CP2 is charging and the voltage on the (+) terminal of comparator U3 is below normal, the current into the negative input of comparator U3 is also reduced below normal but not below the switching threshold.

Whenever relay L operates, contact L1 closes to charge capacitor CP4 via resistor R41 and diode CR5. As capacitor C4 charges, the current into the negative input of comparator U3 is reduced below normal but not below its switching threshold.

If, however, relay L operates within the timing period of capacitor CP3 after the removal of the "A" lead ground, then the current into the negative input of comparator U3 is reduced by the networks of capacitors CP3 and CP4 acting simultaneously. The current to comparator U3 is reduced below the switching threshold, and comparator U3 switches.

Depression of the hold button has opened the A lead ground while maintaining the line loop, due to the conventional sequence of A lead and loop openings. This initiates the timing period of capacitor CP3 and releases relay C. When relay C is released, a path is established from the tip side of the exchange line through the LH winding of relay L, contact C6 and the line loop back to the ring side of the exchange line. Relay L operates. Contact L1 charges capacitor CP4 and the conditions to switch the hold comparator U3 are met. The hold comparator switches.

The output of the hold comparator U3 is connected to both drivers U2 and U4 via their respective (−) terminal resistances R3 and R2. Relays B and C both operate.

A path is now established from the tip side of the exchange line through the LH winding of relay L, closed contacts C6 and B1 and resistance R42 to the ring side of the exchange line. Thus, a hold loop exists which maintains relay L operated and is independent of the line loop (the line loop having opened when the hold button is released).

The output of the hold comparator U3 is also connected to the ringing logic circuit to discharge via diode CR3 and resistor R22. Capacitor CP2 had started to charge when relay L operated. This charging maintains the ringing comparator U1 in the idle state when the line is on hold.

If, during a hold, the power from the exchange is removed (momentary line open), relay L will release opening its contacts L1. Capacitor CP4 discharges through a path through resistor R41, diode CR5 and resistors 45 and 46. As capacitor CP4 is discharging, the current into the negative input to the hold comparator U3 increases until the switching threshold is exceeded whereupon the hold comparator U3 switches back to the idle state. Both drivers U2 and U4 are shut off, relays B and C restore. The circuit therefore returns to its idle state. Both drivers are cut off and relays B and C release restoring the circuit to the idle state.

In the absence of such a line open from the exchange, the hold condition persists pending reselection of the line.

RETURN FROM HOLD TO SEIZE

When the line key is operated and the handset is off-hook, ground again appears on the A lead.

The A lead ground performs the following functions: (1) Operates relay C and maintains it operated via resistor R4 and the driver U4, (2) Switches the hold comparator U3 to the idle state by increasing the current into the negative input beyond the threshold via CR4 and (3) Takes over the function of maintaining the ringing comparator in the idle state by keeping capacitor CP2 discharged via diode CR2 and resistor R22.

With both the hold and ringing comparator in the idle state, relay B releases since its driver is cut off. Contact B1 opens the hold path for relay L. Relay L releases. Contact C1 closes a loss free talk path to the line. With contact L1 in the idle state, capacitor CP4 discharges to the idle level.

RELEASE FROM TALK

The "A" lead and line loop are opened.

In the absence of an A lead ground, relay C releases and the timing period of capacitor CP3 is initiated, however, relay L cannot operate due to the open line loop. With contact L1 in the idle state, capacitor CP4 remains discharged and the hold comparator U3 cannot switch.

The release is therefore distinguished from hold by the failure of the L relay to reoperate during the charging period of capacitor CP3.

In the system as shown, operational amplifiers provide the relay operating logic in a manner so that the operation of either comparator (ring or hold) energizes the B relay, operation of the hold comparator energizes the C relay, and the C relay may also be energized over a path by-passing both comparators.

The system uses the principle of initiating a timing sequence on a charge from the seize condition and using the re-energization of the line relay responsive to a hold to differentiate between the new condition as a hold or a release of the line circuit.

I claim:

1. A line circuit for controlling a line of a key telephone system, including a first and a second relay for producing output signaling conditions of said line circuit; relay operating logic including a first and a second operational amplifier, ring detecting means responsive to ringing signals applied to said line for switching a first of said amplifiers to an operative condition for causing energization of said first relay, means responsive to a hold signal applied to said line for switching said second amplifier to an operative condition to energize both said first and second relays, and means operative in response to a closed loop on said line for energizing said second relay independently of said amplifiers.

2. A line circuit as claimed in claim 1, wherein there are further operational amplifiers interposed respectively between said first and second amplifiers and said first and second relays for driving said first and second relays, all said operational amplifiers being of the same type.

3. A line circuit as claimed in claim 2, in which said means for switching said first and second amplifiers are operative to bias said first and second amplifiers for use as current comparators, and in which there are means for biasing said further amplifiers for use as relay drivers.

4. A line circuit as claimed in claim 3, wherein said first, second and further amplifiers comprise individual current differentiating amplifiers fabricated in a quad integrated circuit array.

5. A line circuit as claimed in claim 1 wherein said means for energizing said second relay independently of said amplifiers include means for biasing said first and second amplifiers to prevent their switching to an operative condition.

6. A line circuit for controlling the signaling and supervision of a line in a key telephone system; comprising a line relay energized in response to ringing signals, means for shunting said line relay to prevent energization thereof on a closed loop at said line, means responsive to the initiation of a hold signal for initiating a time delay, means for energizing said line relay in response to the continuation of a closed loop at said line during the pendency of said time delay, a switching member, activating means for completing a bias path to said switching member responsive to energization of said line relay, said switching member operated responsive to completion of said bias path, a first and second relay energized by operation of said switching member to place a hold bridge across said line and for maintaining said line relay energized.

7. A line circuit as claimed in claim 6, wherein said activating means comprises a solid state comparator switched at a current threshold, and in which said bias path completing means comprises an R-C network directed to an input of said comparator wherein the other input to said comparator includes a reference voltage.

* * * * *